(12) United States Patent
Wenzel et al.

(10) Patent No.: US 11,876,255 B2
(45) Date of Patent: Jan. 16, 2024

(54) SEALING ARRANGEMENT, PLATE ASSEMBLY, ELECTROCHEMICAL SYSTEM, AND METHOD FOR PRODUCING A SEALING ARRANGEMENT

(71) Applicant: Reinz-Dichtungs-GmbH, Neu-Ulm (DE)

(72) Inventors: Stephan Wenzel, Pfaffenhofen (DE); Wolfgang Berroth, Elchingen (DE); Bernd Gaugler, Ulm (DE); Kai-Uwe Lemke, Ulm (DE); André Speidel, Bussmannshausen (DE)

(73) Assignee: REINZ-DICHTUNGS-GMBH, Neu-Ulm (DE)

(*) Notice: Subject to any disclaimer, the term of this patent is extended or adjusted under 35 U.S.C. 154(b) by 51 days.

(21) Appl. No.: 17/316,593

(22) Filed: May 10, 2021

(65) Prior Publication Data

US 2021/0351421 A1 Nov. 11, 2021

(30) Foreign Application Priority Data

May 11, 2020 (DE) ...................... 10 2020 205 902.0

(51) Int. Cl.
*H01M 8/0276* (2016.01)
*H01M 8/0284* (2016.01)
(Continued)

(52) U.S. Cl.
CPC ....... *H01M 8/0276* (2013.01); *H01M 8/0282* (2013.01); *H01M 8/0284* (2013.01); *H01M 8/0286* (2013.01)

(58) Field of Classification Search
CPC ............. H01M 8/0276; H01M 8/0282; H01M 8/0284; H01M 8/0286; H01M 8/0206;
(Continued)

(56) References Cited

U.S. PATENT DOCUMENTS

2005/0181261 A1* 8/2005 Yuan ........................ C08K 3/22
524/779
2018/0375113 A1* 12/2018 Kinpara .............. H01M 8/1069

FOREIGN PATENT DOCUMENTS

DE   102004018344 A1    11/2005
DE   102004062790 A1 *  7/2006  ................ C08J 9/32
(Continued)

OTHER PUBLICATIONS

English translation of DE-102004062790-A1 (Year: 2006).*

*Primary Examiner* — Ula C Ruddock
*Assistant Examiner* — Sarika Gupta
(74) *Attorney, Agent, or Firm* — McCoy Russell LLP (57) ABSTRACT

The present disclosure relates to a sealing arrangement, comprising: an elastomeric sealing element, which comprises a foamed material containing microspheres, and a metal layer having a surface structuring, the surface structuring comprising a plurality of depressions, wherein the sealing element is configured as a coating of the metal layer and is arranged at least in some areas on the surface structuring, wherein a concentration of the microspheres in the sealing element, measured perpendicular to the surface of the metal layer, is inhomogeneous. The disclosure additionally relates to a plate assembly, to an electrochemical system, and to a method for producing the sealing arrangement.

16 Claims, 6 Drawing Sheets

(51) Int. Cl.
*H01M 8/0282* (2016.01)
*H01M 8/0286* (2016.01)

(58) Field of Classification Search
CPC ....... H01M 8/0254; H01M 2008/1095; H01M 8/028; Y02E 60/36; Y02E 60/50; C25B 1/04
See application file for complete search history.

(56) References Cited

FOREIGN PATENT DOCUMENTS

| | | |
|---|---|---|
| DE | 102004062790 A1 | 7/2006 |
| DE | 202014004456 U1 | 5/2015 |
| DE | 202018101235 U1 | 1/2019 |

* cited by examiner

SEALING ARRANGEMENT, PLATE ASSEMBLY, ELECTROCHEMICAL SYSTEM, AND METHOD FOR PRODUCING A SEALING ARRANGEMENT

CROSS-REFERENCE TO RELATED APPLICATION

The present application claims priority to German Patent Application Serial No. 10 2020 205 902.0, entitled "SEALING ARRANGEMENT, PLATE ASSEMBLY, ELECTROCHEMICAL SYSTEM, AND METHOD FOR PRODUCING A SEALING ARRANGEMENT," and filed on May 11, 2020. The entire contents of the above-listed application are hereby incorporated by reference for all purposes.

TECHNICAL FIELD

The present disclosure relates to a sealing arrangement, which comprises an elastomeric sealing element and a metal layer. The disclosure further relates to a plate assembly for an electrochemical system, and to such an electrochemical system comprising such a sealing arrangement. The disclosure additionally relates to a method for producing the sealing arrangement.

BACKGROUND AND SUMMARY

Known electrochemical systems are, for example, fuel cell systems, electrochemical compressor systems or electrolysers. Known electrolysers are configured for example in such a way that, by applying a potential besides producing hydrogen and oxygen from water, these gases will simultaneously be compressed under pressure. Also known in addition are electrochemical compressor systems, such as electrochemical hydrogen compressors for example, to which gaseous molecular hydrogen is fed and in which the latter is electrochemically compressed by applying a potential. This electrochemical compression is suitable for small quantities of hydrogen to be compressed, since a mechanical compression of the hydrogen would be much more laborious here.

Also known are electrochemical systems comprising a stack of electrochemical cells, each separated from one another by bipolar plates. Such bipolar plates may serve for example for indirectly electrically contacting the electrodes of the individual electrochemical cells (for example fuel cells) and/or for indirectly electrically connecting adjacent cells (series connection of the cells). The bipolar plates may also have a channel structure or may form a channel structure, which is configured to supply the cells with one or more media and/or to remove reaction products. The media may be fuels (for example hydrogen or methanol), reaction gases (for example air or oxygen) or coolants. Such a channel structure is usually arranged in an electrochemically active region (flow field) as well as in the distribution and collection regions leading to and away from the latter. Furthermore, the bipolar plates may be configured to transmit the waste heat that arises when converting electrical and/or chemical energy in the electrochemical cell, and also to seal the various media channels, including the cooling channels, with respect to one another and/or with respect to outside. By way of example, the bipolar plates may have openings, through which the media to be fed and/or the reaction products can be routed towards or away from the electrochemical cells arranged between adjacent bipolar plates of the stack.

The electrochemical cells may for example each comprise one or more membrane electrode assemblies (MEAs). The MEAs may have one or more electrically conductive gas diffusion layers, which are usually oriented towards the bipolar plates and are configured for example as an electrically conductive fleece, such as a metal or carbon fleece. The membrane electrode assemblies usually have a frame-like seal at their outer edge, said seal being formed in some embodiments of polymer-based material, such as polymer-based films.

The sealing between the bipolar plates and the membrane electrode assembly usually takes place outside of the electrochemically active region and usually comprises both at least one port seal and one outer seal. The bipolar plates are usually composed of two separator plates, each of which adjoins a membrane electrode assembly. The separator plates may have seals for sealing with respect to the membrane electrode assembly, for example with respect to the frame-like seal of the membrane electrode assembly; if the separator plates are configured as metal plates, for example made of stainless steel, said seals may be integrally formed as sealing beads in the separator plates, for example by embossing, deep drawing or hydroforming. To improve the micro-sealing, such sealing beads usually have polymer-based sealing coatings on at least one side.

In some applications, the sealing device is designed to perform its function equally reliably in a temperature range between a minimum temperature of for example −40° C. and a maximum temperature of for example +100° C. Such temperature changes may occur when starting to operate a fuel cell system at ambient temperature or during a cold start in winter at minus degrees towards the maximum operating temperature of the stack. As already mentioned, the frame-like sealing element of the membrane electrode assembly is usually made of polymer-based material, and the separator plates of the bipolar plate may be made of a metal material. These materials have different thermal expansion coefficients. In the case of a fast cold start, the separator plate and the membrane electrode assembly may expand differently, and the frame-like sealing element may be displaced with respect to the sealing beads. This may lead to a detachment of a coating that may be present on the sealing bead. Usually, the sealing coating on the frame-like sealing element does not slide off, but rather the polymer-based sealing coating comes to adhere at least temporarily to the polymer-based frame-like sealing element. The effects of detachment and adhesion of the coating become obvious when the stack is disassembled, with the coating being pulled off on account of the previous detachment from the bipolar plate.

To further improve the micro-sealing, metal sealing beads are often provided with a microsphere-containing elastomeric coating at least in the area of the beads surrounding the through-openings. Such coatings have an approximately regular distribution of the microspheres in the coating mass, so that a bond between the elastomer and the metal surface does not exist across the entire surface of the coating facing towards the metal surface. Such microsphere-containing elastomeric coatings may therefore detach easily over time, which may lead to leaks in the respective system. It would be desirable if the adhesion of these coatings can be improved.

The object of the present disclosure was to provide a sealing arrangement, a plate assembly and an electrochemical system which at least partially solve the problems mentioned above. In addition, it would be advantageous to develop a method for producing a sealing arrangement.

This object is achieved by the sealing arrangement, the plate assembly and the electrochemical system as well as the method for producing a sealing arrangement according to the independent claims. Further developments form the subject matter of the dependent claims and of the description below.

According to one aspect of the present disclosure, a sealing arrangement is provided. The sealing arrangement comprises:

an elastomeric sealing element, which comprises a foamed material containing microspheres, and a metal layer having a surface structuring, the surface structuring comprising a plurality of depressions.

The sealing element is configured as a coating of the metal layer and is arranged at least in some areas on the surface structuring. A concentration of the microspheres in the sealing element, measured perpendicular to the surface of the metal layer, is inhomogeneous. Due to the inhomogeneous concentration of the microspheres, the sealing element may have an improved adhesion to the metal layer.

The inhomogeneous concentration should be understood here to mean not that only the sizes of the microspheres are different, but may also mean that the volume content of the gas in the polymer matrix is different, that is to say the sum of the volumes of the microspheres relative to a volume of the coating mass consisting of polymer matrix and microspheres.

It may be provided that the sealing element has a first interface adjoining the metal layer, and the concentration of the microspheres in the sealing element is lower within the first interface than outside of the first interface. Given suitable temperature control of the coating, crosslinking and/or expansion process, the sealing element may have a second interface directed away from the metal layer, wherein the concentration of the microspheres in the sealing element is lower within the first and second interface than outside of the first and second interface. The first and the optionally present second interface may individually or together have a thickness of no more than 35%, no more than 30%, or no more than 23% relative to a total maximum layer thickness of the sealing element measured perpendicular to the surface of the metal layer. If only a first interface has a lower concentration of microspheres, the thickness proportion thereof in the maximum layer thickness of the sealing element may also be only at most 18%.

Conversely, the concentration of the polymer-based coating material, that is to say the polymer matrix minus the microspheres, may also be inhomogeneous. The weight content of the polymer matrix may be greater in the first and optionally also the second interface than outside of the first and optionally the second interface. This can be checked for example by a measurement using terahertz radiation or computed tomography.

One possible explanation for the improved adhesion is that the surface of the metal layer that is provided with the surface structuring is usually rougher than the untreated surface. The microspheres may have a lower affinity for the rougher surface than the elastomeric base material, as a result of which the elastomeric base material adheres better to the metal layer in the area of the surface structuring than to smooth, unstructured metal layers. Overall, an increase in the elastomer content and/or polymer matrix content in the interface to the metal layer can be brought about by the surface structuring. Due to the lower concentration of microspheres in the interface, the adhesion of the sealing element to the metal layer can be improved in this area. This greatly improved adhesion of the sealing element to the metal layer has been confirmed in various tests, in which the sealing arrangement proposed in this application was compared with similar sealing arrangements without surface structuring. To this end, the sealing arrangements to be compared were drizzled with organic solvents and then mechanically stressed. It was found in these tests that the sealing arrangement according to the disclosure has an adhesion that is up to ten times stronger.

The sealing arrangement may have an elastically deformable bead integrally formed in the metal layer, said bead sometimes also being referred to as a sealing bead. The surface structuring may be formed on just one surface or on both surfaces of the bead. The sealing element may be arranged at least in some areas on the bead. The bead may have for example a bead top and at least one bead flank adjoining the bead top, or else only a curved bead top with no explicit bead flanks. The surface structuring may extend at least in some areas over the bead top and/or the at least one bead flank. However, the surface structuring may also be extended laterally beyond the area of the bead flank. It may be provided that the surface structuring covers the surface of the bead on at least one side of the metal layer at least in some areas or completely. The bead may be provided at least in some areas or completely with a surface structuring on at least the side of the metal layer that faces towards the component to be sealed, that is to say a sealing edge region of a membrane electrode assembly. The surface structuring and the sealing element may therefore be formed on the convex, outwardly curved surface of the bead. The bead usually has a transverse direction which points from one bead flank towards the bead top and/or towards the optionally present second bead flank or extends along the curvature of the curved bead top. The longitudinal direction of the bead usually corresponds to the direction of extension thereof, that is to say for example around a port in a separator plate.

In the sealing arrangement, a mean diameter of the microspheres may be at least 20 μm, at least 30 μm and/or at most 80 μm, or at most 60 μm. The microspheres are usually filled with a gaseous medium, which may be an expanding agent, such as a gaseous hydrocarbon, which may be a saturated hydrocarbon such as n-pentane, isopentane or isobutane. The gaseous medium is usually enclosed in the microspheres. The compressible gaseous medium in the microspheres may increase the elasticity of the sealing element and thus improve the sealing function of the sealing element.

In some embodiments, the microspheres have a mean diameter which is larger than a width of the depressions. In some embodiments, the microspheres have a mean diameter which is smaller than a width of the depressions. In this case, a further mechanism for better adhesion may be proposed. Due to the fact that the mean diameter of the microspheres is larger than a lateral extent of the depressions, the microspheres cannot accumulate or can only partially accumulate in the area of the interface. On the whole, therefore, the concentration of the microspheres is lower in the interface than outside of the interface.

The layer thickness of the sealing element of the sealing arrangement may for example be in total at most 500 μm, at most 300 μm, at most 200 μm, or at most 150 μm. In some embodiments, the metal layer is provided over its entire surface or in part with the sealing element configured as a coating. Various elastomers are considered for the elastomeric sealing element. By way of example, the sealing element contains FPM (fluoroelastomer), silicone rubber or NBR rubber (nitrile butadiene rubber), PUR (polyurethane), NR (natural rubber), FFKM (perfluoro rubber), SBR (styrene butadiene rubber), BR (butyl rubber), FVSQ (fluorosilicone), CSM (chloro-sulphonated polyethylene), silicone resin, epoxy resin, or mixtures of the aforementioned substances, or pressure sensitive adhesive and/or physically binding adhesive. The sealing element may also contain layers which each comprise one or more of the aforementioned materials.

The depressions may have a width and/or a diameter, which may be measured at the mid-height of the depressions and/or parallel to the untreated and/or unstructured metal surface, of at most 150 µm, at most 100 µm, or at most 70 µm. The depressions may have a depth, which may be measured from the untreated surface of the metal layer in the area around the depression to the lowest point of the depression, of at least 2 µm and/or at most 40 µm. The depressions may have a depth of no more than 20% of the thickness of the metal layer. This ensures that the metal layer has no material weakenings that lead to leaks or breaks in the material during operation.

To achieve a sufficient effect of the surface treatment, an embodiment of maximum spacing of adjacent depressions may be at most five times the diameter of a depression. On the other hand, the depressions may not be arranged too close to one another since this could lead to destruction of the material. Adjacent depressions may have a minimum spacing which corresponds to half the diameter of the depressions. The spacing between adjacent depressions may be different in the longitudinal direction and in the transverse direction of the sealing element. In the transverse direction, the minimum spacing may correspond to at least half the diameter. Furthermore, in the transverse direction, the maximum spacing may correspond to at most three times the diameter. In the longitudinal direction, the minimum spacing may correspond to at least the diameter of a depression. In the longitudinal direction, the maximum spacing may be five times the diameter. If such a sealing element is combined with a sealing bead, the longitudinal and transverse direction of the sealing element correspond respectively to the longitudinal and transverse direction of the sealing bead.

A circumferential edge of the depressions may for example be substantially round, elliptical or oval. The shape of the circumferential edge may depend on the respective position of the depressions on the metal layer. By way of example, the circumferential edge of the depressions arranged on the bead top may differ from the circumferential edge of the depressions arranged on the at least one bead flank (see below).

The depressions may be created by means of laser radiation. In other embodiments, the depressions are created mechanically, for example by engraving or scoring the metal layer. The depressions may be at least partially surrounded by elevations. The elevations may be formed at the respective circumferential edge of the depressions. The respective elevation may protrude above the untreated surface of the metal layer. Said elevation may be configured for example as a crater edge. The crater edge is typically formed when forming the depressions, for example by laser radiation, the crater edge being formed by solidification of molten material. The crater edge or the elevation may thus be formed of the material that has migrated from the depressions.

The metal layer may have further embossed structures, which are created for example by means of deep drawing, embossing and/or hydroforming. These further embossed structures may comprise, besides the sealing beads already mentioned above, structures for guiding media along the metal layer, such as a flow field and/or channel structures.

The sealing element may surround the embossed structures, for example in an intrinsically closed manner. The sealing arrangement may have for example a perimeter bead, that is to say a sealing bead which extends around the flow field and seals off the latter with respect to the surrounding area of the metal layer and has the aforementioned surface structuring at least in some portions and is covered by an elastomeric sealing element.

In certain embodiments, the sealing arrangement may surround, in an intrinsically closed manner, at least one through-opening for gas or liquid which is formed in the metal layer. In some embodiments, said bead surrounds the through-opening in an intrinsically closed manner. By way of example, the sealing arrangement may have a port bead, that is to say a sealing bead which seals off the through-opening for media.

The metal layer is often configured as a separator plate or part of a bipolar plate for an electrochemical system.

According to a further aspect of the present disclosure, a plate assembly for an electrochemical system is proposed. This comprises a sealing arrangement having an elastomeric sealing element, which comprises a foamed material containing microspheres. The system further comprises two separator plates configured as metal layers, which like the metal layers mentioned above are provided with a surface structuring at least in some areas. As in the sealing arrangements mentioned above, the surface structuring comprises a plurality of depressions. The plate assembly further comprises a membrane electrode assembly arranged between the separator plates. The sealing element is configured as a coating on at least one side, or on precisely one side, of each of the separator plates and is arranged at least in some areas on the surface structuring. The sealing arrangement may be arranged on the surface of the separator plates facing towards the membrane electrode assembly. As in the sealing arrangements mentioned above, a concentration of the microspheres in the sealing element, measured perpendicular to the surface of the metal layer, is inhomogeneous.

Each plate assembly may comprise only precisely two separator plates, which are each separated from one another by the membrane electrode assembly. Each separator plate may be a constituent part of a bipolar plate, the bipolar plate typically comprising two separator plates bearing against one another. One bipolar plate thus may belong to two different plate assemblies.

According to a further aspect of the present disclosure, an electrochemical system is proposed. The electrochemical system comprises for example a plurality of plate assemblies of the type described above. As an alternative or in addition, the electrochemical system comprises a plurality of sealing arrangements of the type described above.

The stack comprising the bipolar plates and the electrochemical cells, that is to say the electrochemical system, is usually terminated by an end plate at each end of the stack. At least one of the end plates typically has one or more ports. Lines for feeding the media and/or for removing the reaction products can be connected to said ports. In addition, at least one of the end plates usually has electrical connections, via which the cell stack can be electrically connected to a consumer or to a voltage source. Correspondingly, the electrochemical system may have end plates.

Also proposed by the disclosure is a method for producing a sealing arrangement of the type described above. The method comprises at least the following steps:

providing a metal layer, providing the metal layer with a surface structuring, the surface structuring comprising a plurality of depressions, applying a foamable material containing expandable microspheres to the surface structuring, forming an elastomeric sealing element on the metal layer by expanding the microspheres, wherein a distribution of the expanded microspheres in the sealing element, measured perpendicular to the surface of the metal layer, is inhomogeneous.

Once again, the inhomogeneous concentration should be understood here to mean not that only the sizes of the microspheres are different, but rather that the volume content of the gas in the polymer matrix is different, that is to say the sum of the volumes of the microspheres relative to a volume of the coating mass consisting of polymer matrix and microspheres. Conversely, the concentration of the polymer-based coating material, that is to say the polymer matrix minus the microspheres, may also be inhomogeneous here.

The microspheres may have a mean diameter of at least 5 and/or at most 50 µm in the non-expanded state. In addition, the microspheres may have a mean diameter of at least 20 and/or at most 80 µm in the expanded state. This value may depend for example on a crosslinking rate and/or a degree of crosslinking of the elastomer. The more rapid the crosslinking of the elastomer, the lower the degree of expansion of the microspheres.

By expanding the microspheres, the maximum thickness of the sealing element applied as a layer typically expands to a multiple. By way of example, the finished sealing element has a maximum layer thickness which is at least two times, at least three times, or at least four times the layer thickness of the foamable material.

In one embodiment, the depressions of the surface structuring are created by laser radiation. For example, a pulsed laser can be used for this. The depressions are then formed by a melting of the material of the metal layer. Due to the heat generated as a result of the laser irradiation, very fine particles of metal or metal compounds are detached from the surface and are vaporized. It appears that, in the area of the depressions, a change in the physical surface structure at least partially takes place in the material of the metal layer (for example an electronic and/or geometric structural change). In some cases, a chemical change in the material of the metal layer also occurs (for example altered chemical composition). If, for example, the metal layer is made of stainless steel, the chromium/iron ratio or the oxygen content may be different in the area of the depressions, that is to say in the surface of a depression and/or in the surface in the immediate vicinity of a depression, that is to say in the area close to the surface of the crater edge, than in the region of the unstructured, untreated surface. The surface treatment by means of laser radiation is advantageously carried out in such a way that the mechanical properties of the material of the metal layer are not damaged and the metal layer is not undesirably weakened.

According to one alternative variant of the method, the depressions are created mechanically, for example by engraving to produce a microstructure. In this case, the depressions may also be formed by scoring the metal layer.

In a further optional method step, a sealing bead is integrally formed in the at least one metal layer, which may be done by embossing, by deep drawing and/or by hydraulic methods. This may take place before, at the same time as or after the surface structuring. If the surface structuring is formed by engraving, a simultaneous embossing of the sealing bead may take place. If the surface structuring takes place by engraving to produce a microstructure or by laser irradiation, the sealing bead may be integrally formed beforehand.

The foamable material may be applied by spraying, brush electroplating, screen printing, roller printing, stencil printing or metering processes.

Both the surface structuring and the application of the foamable material may take place only on the convex surface of the sealing bead.

The method is suitable for producing the above-described sealing arrangement, the plate assembly and/or the electrochemical system. Features which are described in connection with the sealing arrangement, the plate assembly and/or the electrochemical system can therefore be combined or claimed with the method, and vice versa.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE FIGURES

Exemplary embodiments of the sealing arrangement, of the plate assembly, of the electrochemical system and of the production method are shown in the figures and will be explained in greater detail on the basis of the following description. In the figures:

FIGS. 1-18 and 20 are shown approximately to scale.

Here and below, features which recur in different figures are in each case denoted by the same or similar reference signs.

DETAILED DESCRIPTION

The present disclosure relates to a sealing arrangement. The sealing arrangement can be used in an electrochemical system 1 (see FIGS. 1-4).

Figure 1:
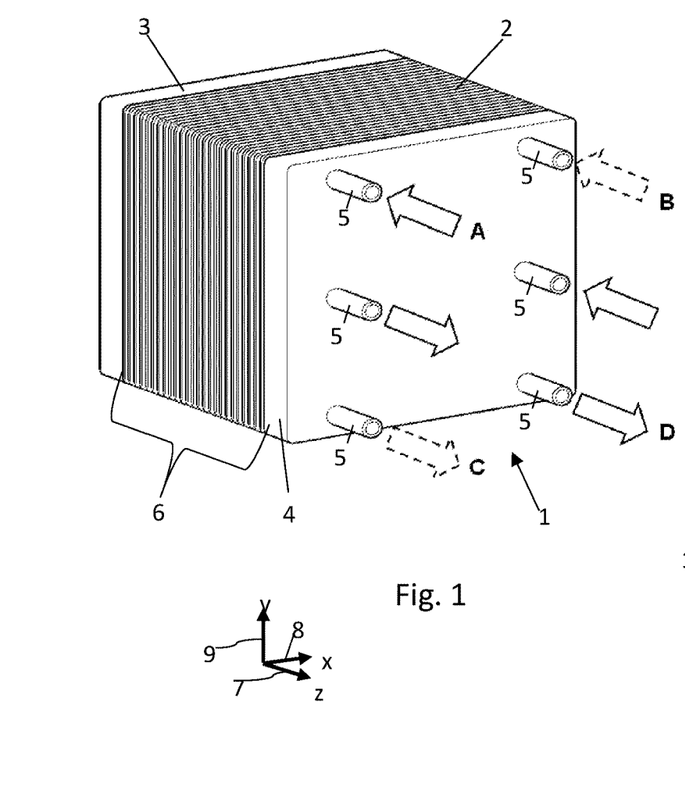
FIG. 1 schematically shows, in a perspective view, an electrochemical system comprising a plurality of separator plates or bipolar plates arranged in a stack.

FIG. 1 shows an electrochemical system 1 comprising a plurality of structurally identical metal bipolar plates 2 which are arranged in a stack 6 and are stacked along a z-direction 7. The bipolar plates 2 of the stack 6 are clamped between two end plates 3, 4. The z-direction 7 will also be referred to as the stacking direction. In the present example, the system 1 is a fuel cell stack. Each two adjacent bipolar plates 2 or the mutually facing separator plates X of each of these bipolar plates 2 of the stack therefore bound an electrochemical cell, which serves for example to convert chemical energy into electrical energy. To form the electrochemical cells of the system 1, a membrane electrode assembly (MEA) is arranged in each case between adjacent bipolar plates 2 of the stack (see for example FIG. 2). The MEA typically contains at least one membrane, for example an electrolyte membrane. Furthermore, a gas diffusion layer (GDL) may be arranged on one or both surfaces of the MEA.

In alternative embodiments, the system 1 may also be configured as an electrolyser, as an electrochemical compressor, or as a redox flow battery. Bipolar plates can likewise be used in these electrochemical systems. The structure of these bipolar plates may then correspond to the structure of the bipolar plates 2 explained in detail here, although the media guided on and/or through the bipolar plates in the case of an electrolyser, an electrochemical compressor or a redox flow battery may differ in each case from the media used for a fuel cell system.

The z-axis 7, together with an x-axis 8 and a y-axis 9, spans a right-handed Cartesian coordinate system. The bipolar plates 2 each define a plate plane, each of the plate planes of the separator plates 2a, 2b of the bipolar plates 2 being oriented parallel to the x-y plane and thus perpendicular to the stacking direction or to the z-axis 7. The end plate 4 has a plurality of media ports 5, via which media can be fed to the system 1 and via which media can be discharged from the system 1. Said media, which can be fed to the system 1 and discharged from the system 1, may comprise for example fuels such as molecular hydrogen or methanol, reaction gases such as air or oxygen, reaction products such as water vapor or depleted fuels, or coolants such as water and/or glycol.

Figure 2:
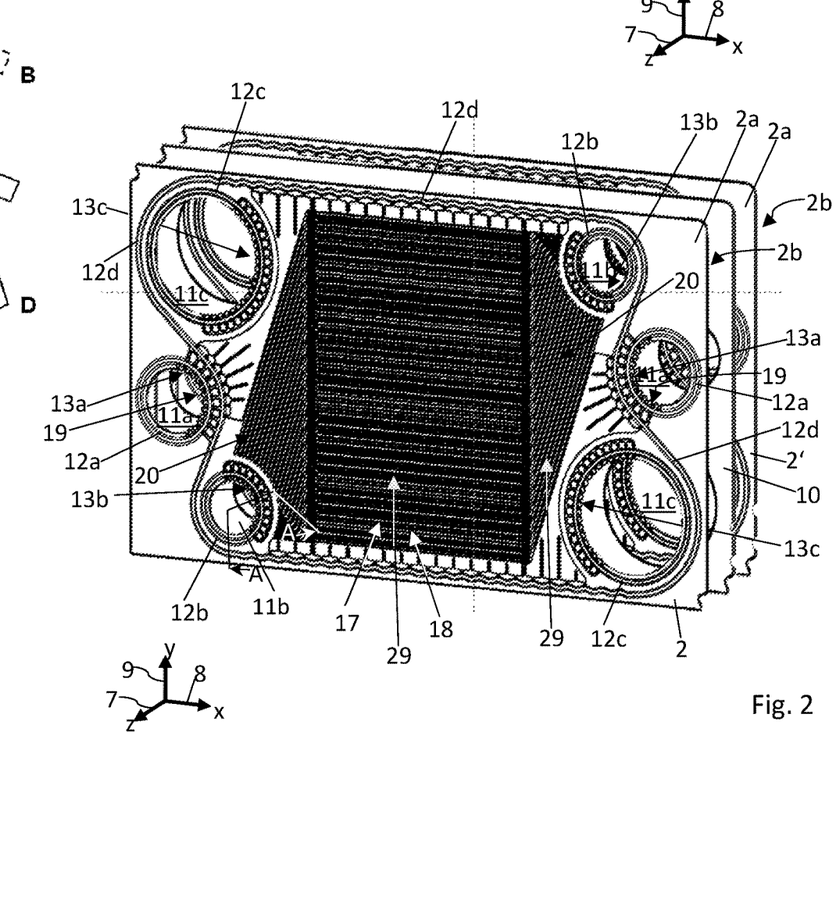
FIG. 2 schematically shows, in a perspective view, two bipolar plates of the system according to FIG. 1 with a membrane electrode assembly (MEA) arranged between the bipolar plates.

FIG. 2 shows, in a perspective view, two adjacent bipolar plates 2 of an electrochemical system of the same type as the system 1 from FIG. 1, as well as a membrane electrode assembly (MEA) 10 known from the prior art, which is arranged between said adjacent bipolar plates 2, the MEA 10 in FIG. 2 being largely obscured by the bipolar plate 2 facing towards the viewer. An embodiment of bipolar plate 2 is formed of two separator plates 2a, 2b which are joined together by a material bond (see for example FIG. 3), of which only the first separator plate 2a facing towards the viewer is visible in FIG. 2, said first separator plate obscuring the second separator plate 2b. The separator plates 2a, 2b may each be manufactured from a metal sheet, for example from a stainless-steel sheet. The separator plates 2a, 2b may for example be welded to one another, for example by laser welds.

The separator plates 2a, 2b have through-openings, which are aligned with one another and form the through-openings 11a-c of the bipolar plate 2. When a plurality of bipolar plates of the same type as the bipolar plate 2 are stacked, the through-openings 11a-c form lines which extend through the stack 6 in the stacking direction 7 (see FIG. 1). Typically, each of the lines formed by the through-openings 11a-c is fluidically connected to one of the ports 5 in the end plate 4 of the system 1. For example, coolant can be introduced into the stack or discharged from the stack via the lines formed by the through-openings 11a. In contrast, the lines formed by the through-openings 11b, 11c may be configured to supply fuel and reaction gas to the electrochemical cells of the fuel cell stack 6 of the system 1 and to discharge the reaction products from the stack. The media-guiding through-openings 11a-11c are substantially parallel to the plate plane.

In order to seal off the through-openings 11a-c with respect to the interior of the stack 6 and with respect to the surrounding environment, an embodiment of the first separator plates 2a usually have sealing arrangements in the form of sealing beads 12a-c, which are each arranged around the through-openings 11a-c and in each case completely surround the through-openings 11a-c. On the rear side of the bipolar plates 2, facing away from the viewer of FIG. 2, the second separator plates 2b have corresponding sealing beads for sealing off the through-openings 11a-c (not shown).

In an electrochemically active region 18, the first separator plates 2a have, on the front side thereof facing towards the viewer of FIG. 2, a flow field 17 with structures for guiding a reaction medium along the front side of the separator plate 2a. In FIG. 2, these structures are defined by a plurality of webs and channels extending between the webs and delimited by the webs. On the front side of the bipolar plates 2 facing towards the viewer of FIG. 2, the first separator plates 2a additionally have a distribution or collection region 20. The distribution or collection region 20 comprises structures which are configured to distribute over the active region 18 a medium that is introduced into the distribution or collection region 20 from a first of the two through-openings 11b, and/or to collect or to pool a medium flowing towards the second of the through-openings 11b from the active region 18. In FIG. 2, the distributing structures of the distribution or collection region 20 are likewise defined by webs and channels extending between the webs and delimited by the webs. In general, therefore, the elements 17, 18, 20 can be understood as media-guiding embossed structures.

The sealing beads 12a-12c usually have passages 13a-13c, which are embodied here at least partially as local elevations of the bead, of which the passages 13a are formed both on the underside of the upper separator plate 2a and on the upper side of the lower separator plate 2b, while the passages 13b are formed in the upper separator plate 2a and the passages 13c are formed in the lower separator plate 2b. By way of example, the passages 13a enable a passage of coolant between the through-opening 12a and the distribution region, so that the coolant reaches the distribution region between the separator plates and is guided out therefrom. Furthermore, the passages 13b enable a passage of hydrogen between the through-opening 12b and the distribution region on the upper side of the upper separator plate 2a; these passages 13b are characterized by perforations facing towards the distribution region and extending at an angle to the plate plane. Therefore, hydrogen for example flows through the passages 13b from the through-opening 12b to the distribution region on the upper side of the upper separator plate 2a, or in the opposite direction. The passages 13c enable a passage of air for example between the through-opening 12c and the distribution region, so that air reaches the distribution region on the underside of the lower separator plate 2b and is guided out therefrom. The associated perforations are not visible here.

The first separator plates 2a also typically each have a further sealing arrangement in the form of a perimeter bead 12d, which extends around the flow field 17 of the active region 18, the distribution or collection region 20 and the through-openings 11b, 11c and seals these off with respect to the through-opening 11a, that is to say with respect to the coolant circuit, and with respect to the environment surrounding the system 1. The second separator plates 2b each comprise corresponding perimeter beads. The structures of the active region 18, the distributing structures of the distribution or collection region 20 and the sealing beads 12a-d are each formed in one piece with the separator plates 2a and are integrally formed in the separator plates 2a, for example in an embossing process, deep-drawing process and/or by means of hydroforming. The same applies to the corresponding distributing structures and sealing beads of the second separator plates 2b. Outside of the region surrounded by the perimeter bead 12d, a predominantly unstructured outer edge region 22 is formed in each separator plate 2a, 2b.

The two through-openings 11b or the lines through the plate stack of the system 1 that are formed by the through-openings 11b are each fluidically connected to one another via passages 13b in the sealing beads 12b, via the distributing structures of the distribution or collection region 20 and via the flow field 17 in the active region 18 of the first separator plates 2a facing towards the viewer of FIG. 2. Analogously, the two through-openings 11c or the lines through the plate stack of the system 1 that are formed by the through-openings 11c are each fluidically connected to one another via corresponding bead passages, via corresponding distributing structures and via a corresponding flow field on an outer side of the second separator plates 2b facing away from the viewer of FIG. 2. In contrast, the through-openings 11a or the lines through the plate stack of the system 1 that are formed by the through-openings 11a are each fluidically connected to one another via a cavity 19 that is enclosed or surrounded by the separator plates 2a, 2b. This cavity 19 serves in each case to guide a coolant through the bipolar plate 2, for cooling the electrochemically active region 18 of the bipolar plate 2.

Figure 3:
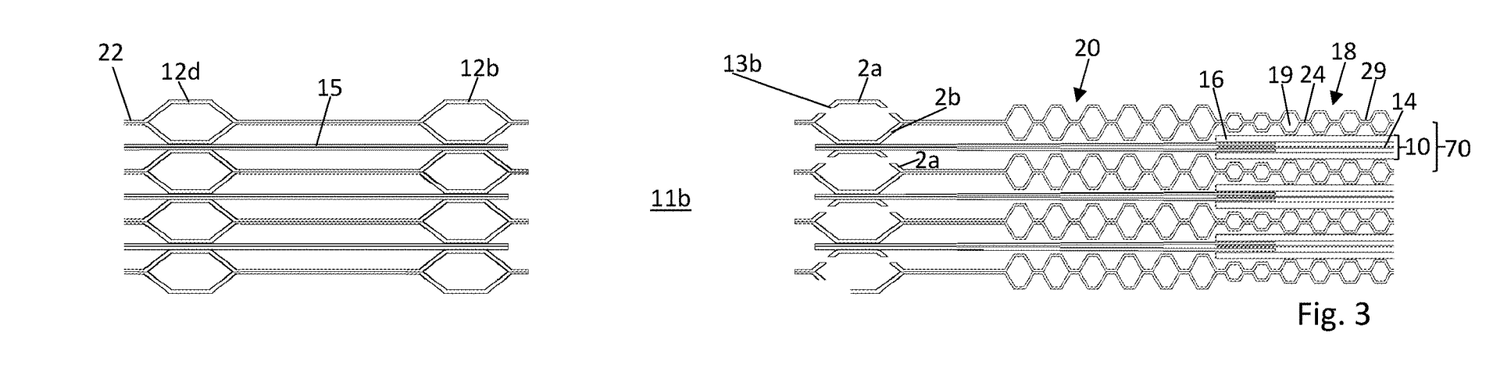
FIG. 3 schematically shows a section through a plate stack of a system of the same type as the system shown in FIG. 1.

FIG. 3 schematically shows a section through a portion of the plate stack 6 of the system 1 of FIG. 1, the sectional plane being oriented in the z-direction and thus perpendicular to the plate planes of the bipolar plates 2; it may extend for example along the kinked section line A-A in FIG. 2.

The structurally identical bipolar plates 2 of the stack each comprise the above-described first metal separator plate 2a and the above-described second metal separator plate 2b. Each metal separator plate 2a, 2b has a thickness of around 75 μm. Structures for guiding media along the outer faces of the bipolar plates 2 are visible, here in the form of webs and channels delimited by the webs. Shown here are channels 29 on the surfaces of adjoining separator plates 2a, 2b directed away from one another, as well as cooling channels 19 between adjoining separator plates 2a, 2b. Between the cooling channels 19, the two separator plates 2a, 2b bear against one another in a contact region 24 and are connected to one another at that point, in the present example by means of laser welds.

A membrane electrode assembly (MEA) 10, known for example from the prior art, is arranged in each case between adjacent bipolar plates 2 of the stack. The MEA 10 typically comprises a membrane 14, for example an electrolyte membrane, and a sealing edge region 15 connected to the membrane. By way of example, the sealing edge region may be materially connected to the membrane, for example by an adhesive bond or by lamination.

The membrane of the MEA 10 extends in each case at least over the active region 18 of the adjoining bipolar plates 2 and at that location enables a proton transfer via or through the membrane. The membrane does not extend into the distribution or collection region 20. The sealing edge region 15 of the MEA 10 serves in each case for positioning, fastening and sealing off the membrane between the adjoining bipolar plates 2. If the bipolar plates 2 of the system 1 are clamped between the end plates 3, 4 in the stacking direction (see FIG. 1), the sealing edge region 15 of the MEA 10 may be compressed for example in each case between the port beads 12a-c of the respective adjoining bipolar plates 2 and/or in each case at least between the perimeter beads 12d of the adjoining bipolar plates 2, in order in this way to fix and seal off the MEA 10 between the adjoining bipolar plates 2.

The sealing edge region 15 in each case covers the distribution or collection region 20 of the adjoining bipolar plates 2. Towards the outside, the edge portion 15 may also extend beyond the perimeter bead 12d and may adjoin the outer edge region 22 of the separator plates 2a, 2b (cf. FIG. 2).

Gas diffusion layers 16 may additionally be arranged in the active region 18. The gas diffusion layers 16 enable a flow across the membrane 14 over the largest possible area of the surface of the membrane 14 and may thus improve the proton transfer via the membrane 14. The gas diffusion layers 16 may be arranged for example on both sides of the membrane 14 in the active region 18 between the adjoining separator plates 2. The gas diffusion layers 16 may for example be formed of an electrically conductive nonwoven or may comprise an electrically conductive nonwoven. The electrically conductive nonwoven may be a metal fleece or a carbon fleece.

Figure 4:
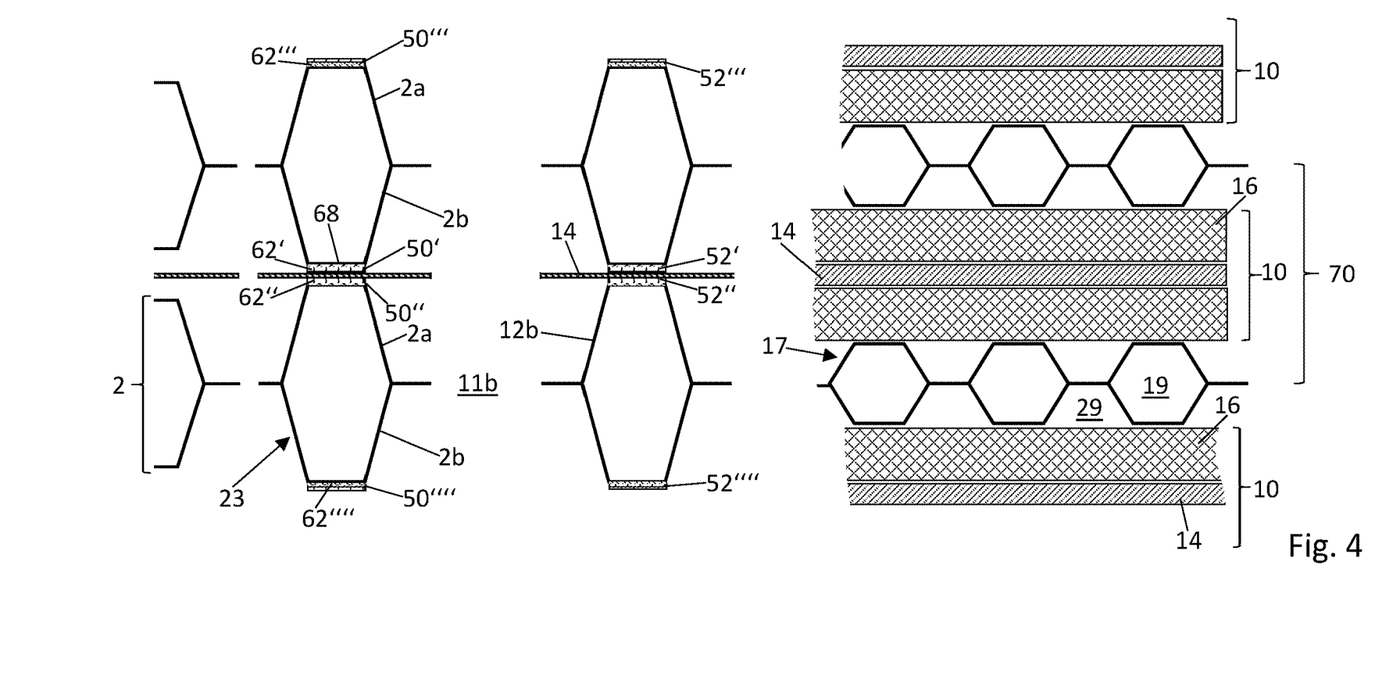
FIG. 4 schematically shows a further section through a plate stack of a system of the same type as the system shown in FIG. 1.

FIG. 4 schematically shows a further section through a portion of the plate stack 6 of the system 1 of FIG. 1. Here, the section has been selected such that it extends through two adjacent bipolar plates 2. For space reasons, the section is shown in broken off towards both outer sides of the beads 12b extending around the through-opening 11b. In the area of the peripheral bead 12b, sealing arrangements 50', 50'', 50''', 50'''' according to the disclosure, each comprising a sealing element 52', 52'', 52''', 52'''', which will be described in greater detail below, are arranged between each bipolar plate 2 and the sealing edge region 15 of the membrane electrode assembly 10.

The first sealing arrangement 50' comprises the separator plate 2b configured as a metal layer 60, which is provided with a surface structuring 62' of the type described above on the bead top 68 thereof, that is to say the convex side thereof.

An elastomeric sealing element 52' containing microspheres 54 is arranged on the surface structuring 62'. The second sealing arrangement 50" comprises the separator plate 2a configured as a metal layer 60, which is likewise provided with a surface structuring 62" on the bead top thereof. A further elastomeric sealing element 52" containing microspheres 54 is arranged on the surface structuring 62". The sealing elements 52' and 52" may be made of the same elastomeric material or of different elastomeric materials. The first sealing arrangement 50' faces towards the second sealing arrangement 50". On the concave sides thereof, the sealing arrangements 50', 50" are each formed without surface structuring and without an elastomeric coating. The first sealing arrangement 50' and the second sealing arrangement 50" bear against both sides of the sealing edge region 15 of the membrane electrode assembly; they seal around the port bead 12b. The metal layers 60 of the separator plates 2a, 2b on the one hand and the sealing edge regions 15 formed of polymer-based materials have different thermal expansion coefficients. In the case of a fast cold start, the separator plate 2a, 2b and the sealing edge regions 15 may expand differently and the frame-like sealing element may be displaced with respect to the sealing beads. Due to the high microsphere content in the respective elastomeric sealing element 52', 52" the latter may at least partially follow the displacement. Furthermore, the surface structuring 62, 62' of the metal layers 60 with the lower microsphere concentration in the first interface 57 of the elastomeric sealing elements 52', 52" (see FIGS. 6-9) ensures a better adhesion of the elastomeric sealing elements 52', 52" to the respective separator plate 2a, 2b.

The embodiments of FIG. 3 and FIG. 4 show that in each case only one separator plate 2b and one separator plate 2a belongs to a plate assembly 70. In both examples, the separator plate 2b arranged on the upper side of the membrane electrode assembly 10 and the separator plate 2a arranged on the underside of the membrane electrode assembly 10 belong to the plate assembly 70 explicitly provided with a reference sign. The separator plate 2a of the bipolar plate 2 arranged on the upper side of the membrane electrode assembly 10 already belongs to the next plate assembly.

As indicated above, the electrochemical system 1 comprises sealing arrangements 50, which will be described in greater detail below.

Figure 5:
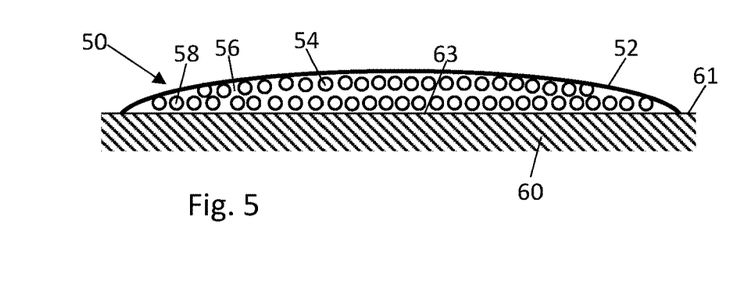
FIG. 5 shows a section through a sealing arrangement according to the prior art.

FIG. 5 shows a section through a sealing arrangement 50 according to the prior art, which comprises an elastomeric sealing element 52 and a metal layer 60. The elastomeric sealing element 52 is configured as a coating of the metal layer 60 and comprises a foamed material containing microspheres 54. Here, a concentration of the microspheres 54 in the sealing element 52, measured perpendicular to the surface 61 of the metal layer 60, is substantially homogeneous. Although the microspheres 54 in FIGS. 5-9 are shown in idealized form as elements which are round and of equal size in each case, this does not mean that they are all of the same size. A homogeneous distribution of the concentration of the microspheres 54 is accordingly to be understood to mean that the volume content of the gas based on a sufficiently long portion of the sealing arrangement 50, for example along a portion corresponding to at least ten times the width of the sealing arrangement 50, in a direction perpendicular to the surface 61 of the metal layer 60 substantially does not change. The volume or weight content of the polymer matrix likewise remains constant in this portion of the sealing arrangement 50 in the same direction.

It has been found that the sealing arrangement 50 shown in FIG. 5 cannot always withstand to the desired extent the mechanical and/or thermal stresses that occur during the operation of the electrochemical system 1. The adhesion of the sealing element 52 to the metal layer 60 may sometimes be insufficient, as a result of which the elastomeric sealing element 52 may detach from the metal layer 60.

After carrying out various tests, the inventors of the present disclosure have discovered that the adhesion of the elastomeric sealing element 52 to the metal layer 60 can be significantly improved if the metal layer 60 has a surface structuring 62.

FIGS. 6-9 show sections through sealing arrangements 50 according to the disclosure, wherein the metal layers 60 thereof have such surface structuring 62. As in the case of the sealing arrangement 50 of FIG. 5, the sealing arrangements 50 shown in FIGS. 6-9 each comprise an elastomeric sealing element 52 and a metal layer 60. The elastomeric sealing element 52 is configured as a coating of a surface 61 of the metal layer 60 and comprises a foamed material containing microspheres 54.

In contrast to FIG. 5, however, the metal layer 60 has a surface 61 with a surface structuring 62. The surface structuring 62 of the metal layer 60 comprises a plurality of depressions 64. The sealing element 52 is arranged at least in some areas on the surface structuring 62. It has been found that a concentration of the microspheres 54, that is to say the volume content of gas, in the sealing element 52, measured perpendicular to the surface 61 of the metal layer 60, is inhomogeneous. The sealing element 52 may have a first interface 57 adjoining the metal layer 60, wherein the concentration of the microspheres 54, that is to say the volume content of gas, in the sealing element 52 is lower within the first interface 57 than outside of the first interface 57. Conversely, the weight content of the polymer matrix is higher in the first interface 57 than outside of the first interface 57. The first interface 57 may for example have a thickness of at most 35%, at most 30%, at most 23%, or at most 18% relative to a total maximum layer thickness of the sealing element 52 measured perpendicular to the surface 61 of the metal layer 60. In addition, the sealing element 52 may also have a second interface 59 directed away from the metal layer 60, wherein the concentration of the microspheres 54, that is to say the volume content of gas, in the sealing element 52 is lower within the second interface 59 than outside of the first and second interface 57, 59. Conversely, the weight content of the polymer matrix is higher in the first and second interface 57, 59 than outside of the first and second interface 57, 59. Together, that is to say in sum along a line perpendicular to the surface of the metal layer, the first and second interface 57, 59 may have for example a thickness of no more than 35%, no more than 30%, or no more than 23% relative to a total maximum layer thickness of the sealing element 52 measured perpendicular to the surface 61 of the metal layer 60. The formation of such a second interface 59 of the sealing element 52 requires suitable process control, such as suitable temperature control of the coating, crosslinking and/or expansion process. Advantageously, the crosslinking takes place prior to the expansion in the first and optionally second interface.

One possible first mechanism (or explanation) for the inhomogeneous concentration of the microspheres 54 in the elastomeric sealing element 52 would be that the coating material of the sealing element 52 without microspheres has a higher affinity for the surface structuring 62 than the coating material containing the microspheres 54. The reason for the modified (higher) affinity may possibly be that the chemical surface composition of the metal layer 60 is different in the area of the surface structuring 62 than in the untreated, non-structured area, and/or that the roughness of the metal layer 60 is different in the area of the surface structuring 62 than in the untreated, non-structured area. This may be true in the case of laser treatment of the metal layer 60 (see production method below). One possible second mechanism for this would be that the depressions 64 of the surface treatment have dimensions which are smaller than the dimensions of the microspheres 54. The microspheres 54 do not fit geometrically into the depressions 64 and therefore the concentration of the microspheres 54 is lower in the interface 59 than above the interface 59. It should be noted that the two mechanisms presented are not mutually exclusive and may possibly take place simultaneously.

Figure 6:
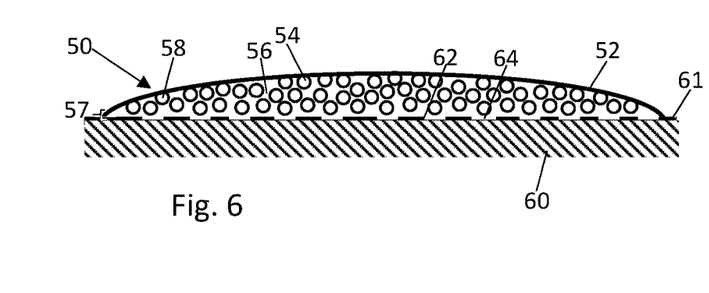
FIG. 6 shows a section through a sealing arrangement according to one embodiment.
Figure 7:
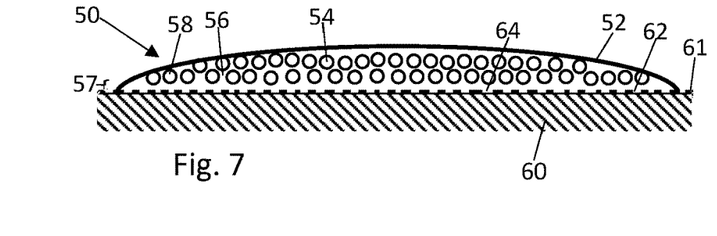
FIG. 7 shows a section through a sealing arrangement according to one embodiment.

The sealing elements 52 of the sealing arrangements 50 shown in FIGS. 6 and 7 are arranged only on a surface area of the metal layer 60 that has the surface structuring 62. In other words, the sealing arrangements 50 are not situated at untreated locations on the metal layer 60.

Figure 8:
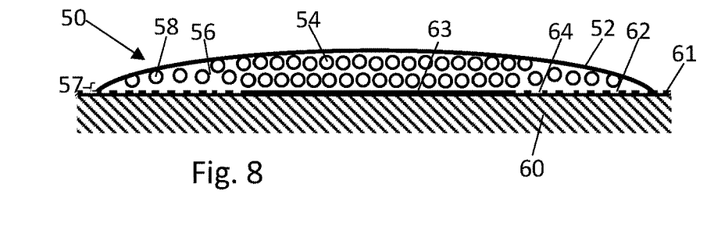
FIG. 8 shows a section through a sealing arrangement according to one embodiment.
Figure 9:
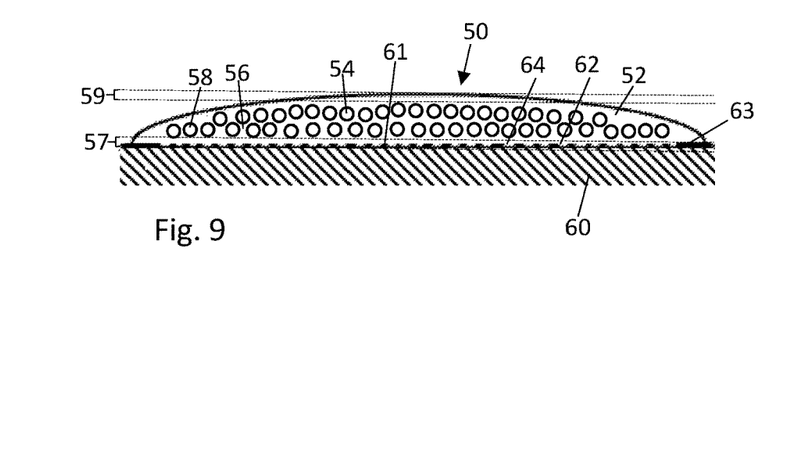
FIG. 9 shows a section through a sealing arrangement according to one embodiment.

The sealing element 52 shown in FIG. 8 is arranged partially on the surface structuring 62. The sealing element 52 is also arranged partially on an untreated, smooth area 63 of the metal layer 60. The surface structuring 62 is therefore present only in some portions on the surface 61 of the metal layer 60 that is coated by the sealing element 52. The sealing element 52 shown in FIG. 9 extends slightly beyond the surface structuring 62 on both sides into the untreated area 63; here, too, the surface structuring 62 is therefore present only in some portions on the surface 61 of the metal layer 60 that is coated by the sealing element 52.

The layer thickness of the sealing element 52 may for example be in total no more than 500 μm, no more than 300 μm, no more than 200 μm, or no more than 150 μm. The layer thickness may be determined here perpendicular to the surface 61 of the metal layer 60. The elastomeric sealing element 52 may contain the following substances: FPM (fluoroelastomer), silicone rubber or NBR rubber (nitrile butadiene rubber), PUR (polyurethane), NR (natural rubber), FFKM (perfluoro rubber), SBR (styrene butadiene rubber), BR (butyl rubber), FVSQ (fluorosilicone), CSM (chlorosulphonated polyethylene), silicone resin, epoxy resin, or mixtures of the aforementioned substances, or pressure sensitive adhesive and/or physically binding adhesive. Fillers or other additives may also be provided in the elastomeric material of the sealing element 52.

In the expanded state, the microspheres are usually filled with a gaseous medium 58, wherein the gas 58 may be for example a saturated hydrocarbon, such as n-pentane, isopentane or isobutane. The gas 58 is usually enclosed in the microspheres 54 and may not be able to escape from the sealing element 52.

A mean diameter of the microspheres 54 may be at least 20 μm and/or at most 80 μm in the expanded state. According to one example, the microspheres 54 have a mean diameter in the range 35 to 55 μm. The depressions 64 may have a width or a diameter, which may be measured at the mid-height of the depressions 64 and/or parallel to the untreated metal surface 61, of at most 150 μm, at most 100 μm, or at most 70 μm. Due to the size of the depressions 64 in the micrometre range, the surface structuring can also be referred to as surface microstructuring. Adjacent depressions 64 may be spaced apart from one another and therefore do not merge into one another.

In the embodiment of FIG. 6, the depressions 64 have a diameter which is larger than a mean diameter of the microspheres 54. In the embodiment of FIG. 7, the diameter of the depressions 64 is smaller than a mean diameter of the microspheres 54. FIGS. 5 to 9 are simplified in that all the microspheres are shown with the same diameter, but in fact they have a range of diameters.

Figure 20:
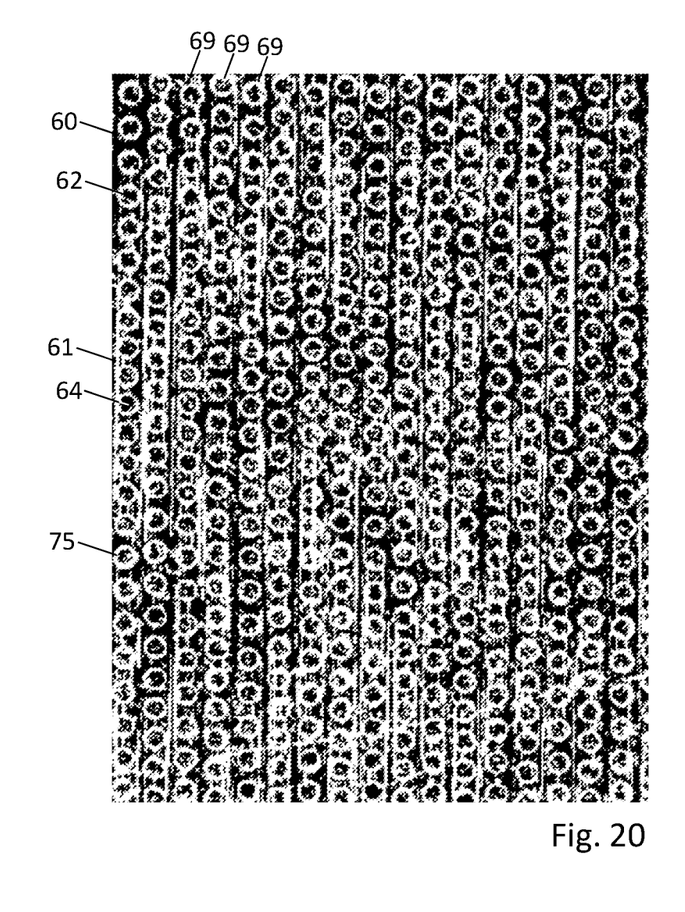
FIG. 20 shows a microscope image of a metal layer for a sealing arrangement, the metal layer being provided with a surface structuring.

In this connection, reference should also be made to FIG. 20, which shows a microscope image of the metal layer 60 with the surface structuring 62 in the form of depressions 64. FIG. 20 will be discussed again below.

In general, the depressions 64 may have a depth of at least 2 μm and/or at most 40 μm. The depth of the depressions 64 may be no more than 20% of the thickness of the metal layer 60. The depth of the depressions 64 may be measured from the untreated surface 61 to the lowest point of the depression 64.

A size of the individual depressions 64 lies for example in a range from 0.0001 to 0.05 mm$^2$, 0.001 to 0.02 mm$^2$, or 0.0008 to 0.01 mm$^2$. According to one variant, there are around 500 to 100,000, or around 4000 to 20,000 depressions 64 per square centimetre. It may be provided that 10 to 90%, 20 to 50%, or 25 to 50% of the surface 61 of the metal layer 60 that is provided with a surface structuring 62 is taken up by the depressions 64.

The depressions 64 may be created by means of laser radiation. In other embodiments, the depressions 64 are created mechanically, for example by engraving or scoring the metal layer 60.

FIGS. 10-18 shows sections through examples of beads 65 of metal layers 60.

Figure 10:
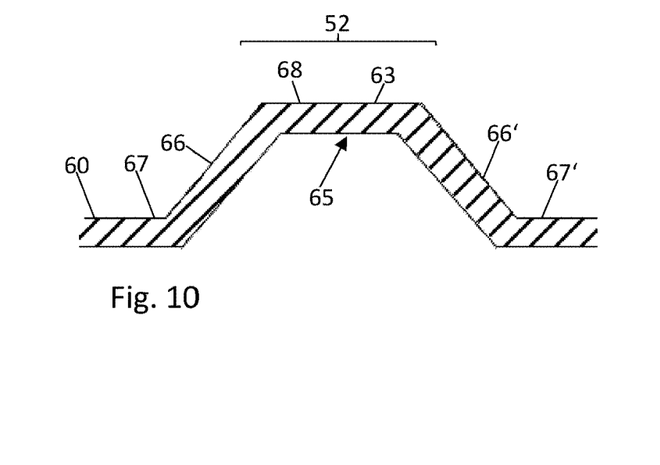
FIG. 10 shows a section through a bead according to the prior art.

FIG. 10 shows a metal layer 60 according to the prior art, which has a bead 65. The metal layer 60 and the bead 65 has a relatively smooth, unstructured surface 63 and thus has no surface structuring 62.

In contrast, the metal layers 60 and the beads 65 thereof shown in FIGS. 11-18 have a surface structuring 62 at least in some areas. The surface structuring 62 is formed on a surface of the bead 65, namely on the surface of the layer 60 on which the convex side of the bead 65 projects. For the sake of clarity, the sealing element 52 has not been shown here. It is clear to a person skilled in the art that the sealing element 52 in the sealing arrangement 50 is situated on the bead 65; the width (lateral extent) of the sealing element is indicated in each case by a bracket 52.

Figure 13:
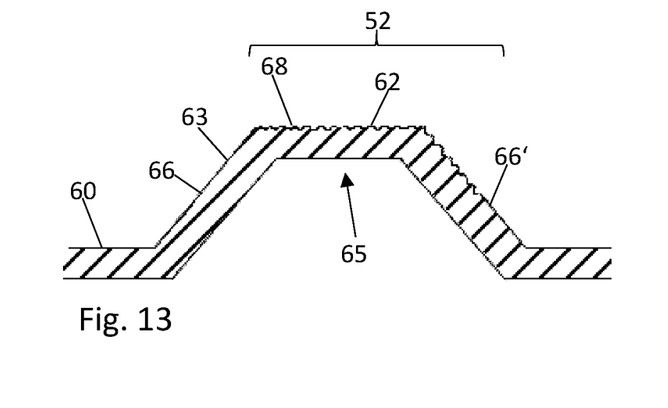
FIG. 13 shows a section through a bead according to one embodiment.
Figure 14:
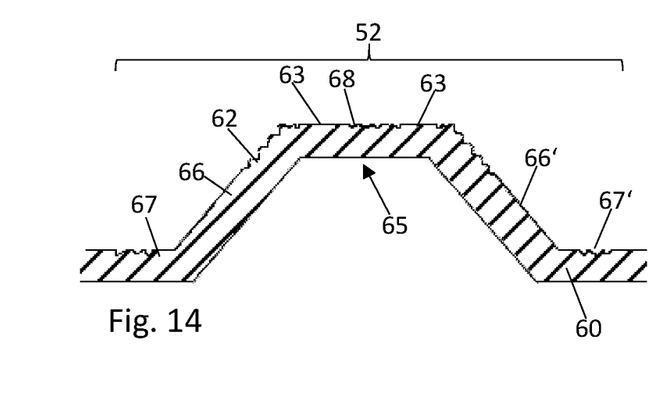
FIG. 14 shows a section through a bead according to one embodiment.
Figure 15:
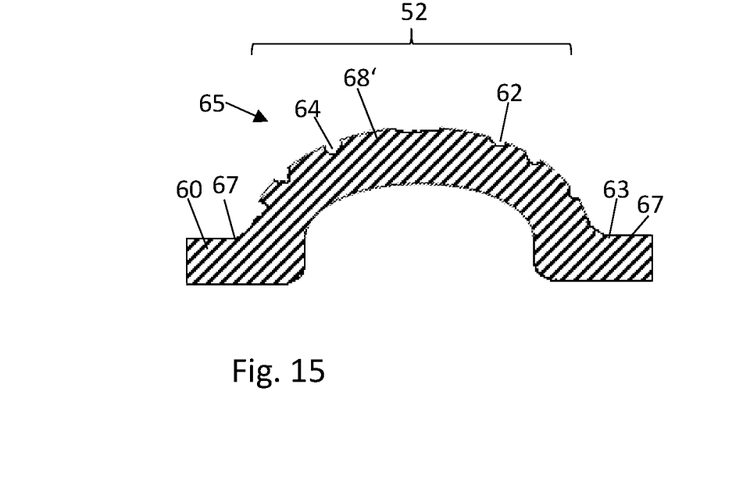
FIG. 15 shows a section through a bead according to one embodiment.
Figure 16:
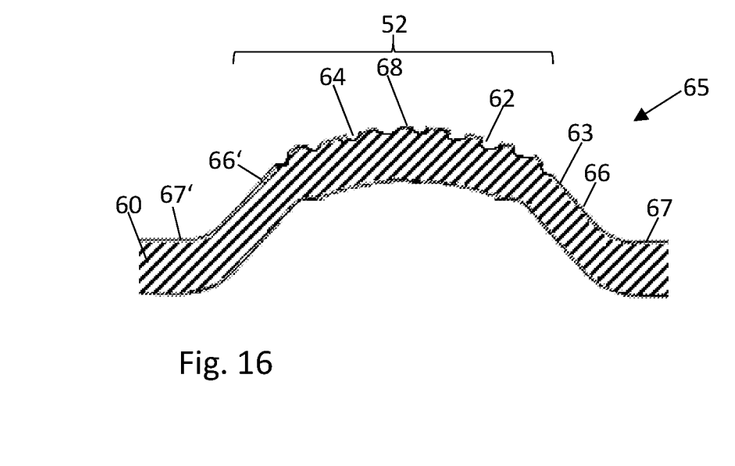
FIG. 16 shows a section through a bead according to one embodiment.
Figure 17:
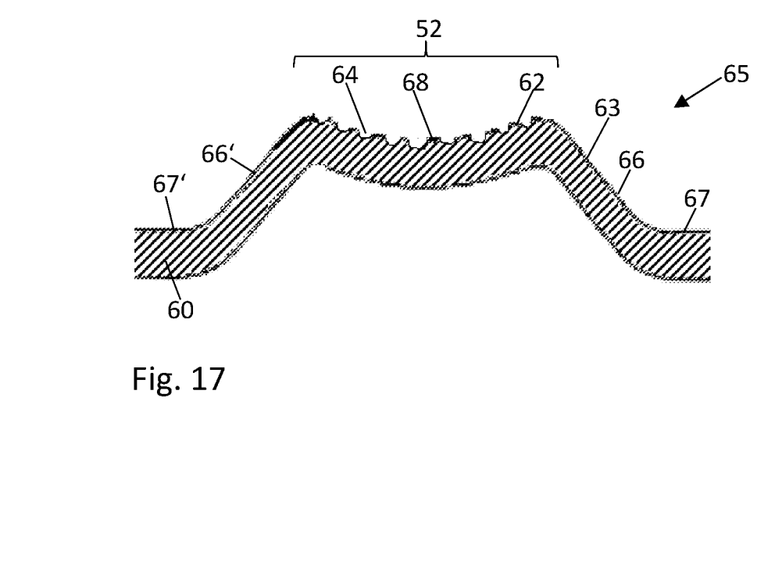
FIG. 17 shows a section through a bead according to one embodiment.
Figure 18:
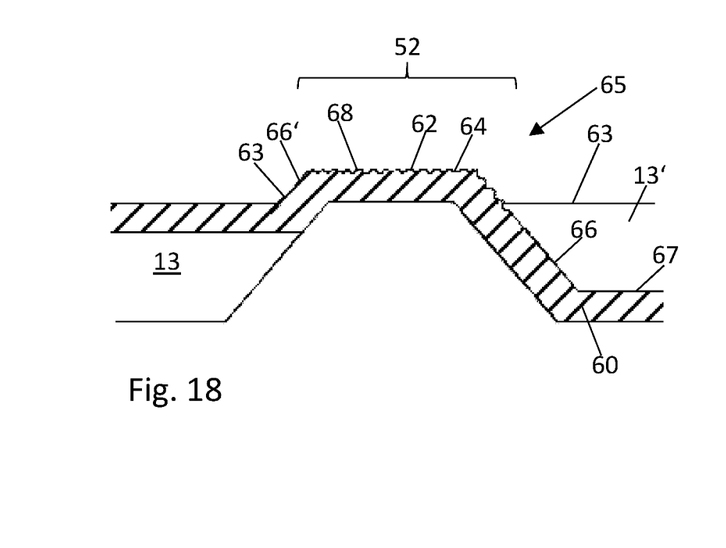
FIG. 18 shows a section through a bead according to one embodiment.

Each bead 65 according to one embodiment of the disclosure, shown in FIGS. 11-18, is integrally formed in the metal layer 60, for example by embossing, deep drawing and/or hydroforming. In some of the embodiments, shown in FIGS. 11-14 and 16-18, each bead 65 has at least one bead flank 66, 66' and a bead top 68, the bead top 68 adjoining the bead flanks 66, 66' at both sides. The bead top 68 forms an elevation compared to a plate plane defined by the metal layer 60, for example in the outer edge region 22 thereof. In the region of the bead flanks 66, 66', the material of the layer 60 rises at an angle out of the plate plane. The bead top 68 may be a region of the bead 65 that extends substantially parallel to the plate plane, as shown in FIGS. 11-14 and 18, or may have a curvature, as shown in FIGS. 16-17. In the embodiment of FIG. 15, on the other hand, the bead 65 has only a strongly curved bead top 68', so that the flanks are integrated in this curvature, that is to say no explicit bead flanks are present.

As can be seen from FIGS. 11-18, the surface structuring 62 extends at least in some areas over the bead top 68, 68' and/or the optionally present at least one bead flank 66, 66'.

Figure 11:
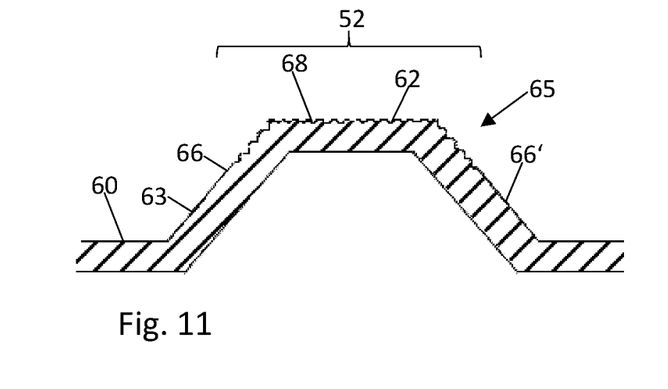
FIG. 11 shows a section through a bead according to one embodiment.
Figure 12:
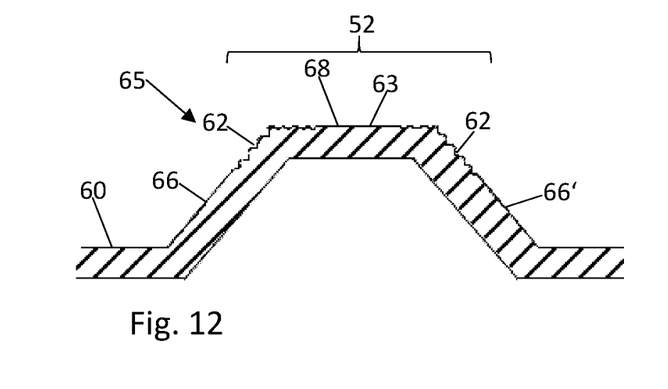
FIG. 12 shows a section through a bead according to one embodiment.

It is therefore indicated in the variants of FIGS. 11, 13 and 15-18 that the entire bead top 68 is provided in full with the surface structuring 62, while the bead top 68 of FIGS. 12 and 14 has a surface structuring 62 in some areas but has at least one unstructured area 63 in the middle or at least spaced apart from the bead flanks 66, 66'.

In the variants of FIGS. 11, 12 and 14, around one-third of each bead flank 66, 66' is provided with the surface structuring 62. The surface structuring 62 of the bead flanks 66, 66' in this case adjoins the surface structuring 62 of the bead top 68.

In the variant of FIG. 13, only the bead flank 66' comprises a surface structuring 62, whereas the bead flank 66 is unstructured or smooth. In other variants, the structuring 62 may change in the course of the bead 65 from bead flank 66' to bead flank 66 and back again, it being possible for the change to take place multiple times. This is the case for example in the variant of FIG. 18, in which a section through a bead 65 is shown, which to the left merges into a passage 13, and the next passage 13', which is offset in relation to the passage 13 shown in section, is visible in the background on the right. The passages 13, 13' are free of surface structuring and coatings. In the case of such a surface structuring 62 which changes between the bead flanks 66, 66', the total width of the surface structuring 62 along the course or change thereof may vary or remain the same.

However, the surface structuring 62 may alternatively also be extended laterally beyond the area of the respective bead flank 66, 66' and may cover part of the bead foot 67, 67', as shown in the variant of FIG. 14.

The bead 65 shown in FIGS. 11-18 may for example be or comprise one of the beads 12a-d mentioned above. Accordingly, the bead 65 may surround, in an intrinsically closed manner, one of the through-openings 11a-c for fluids or the flow field 17 and may be configured as a sealing bead 12a-d.

The metal layer 60 may be configured for example as one of the layers or plates 2, 2a, 2b mentioned above, for example as a separator plate 2a, 2b (cf. FIGS. 1-4).

Figure 19:
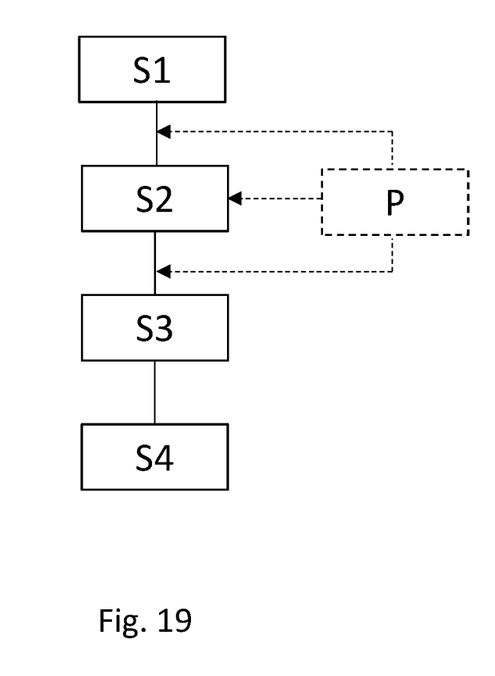
FIG. 19 shows a flowchart of a method according to the disclosure for producing a sealing arrangement.

FIG. 19 shows a flowchart of a method according to the disclosure for producing a sealing arrangement 50, such as the sealing arrangement described above.

The method comprises at least the following steps.
providing S1 a metal layer 60,
providing S2 the metal layer 60 with a surface structuring 62, the surface structuring 62 comprising a plurality of depressions 64,
applying S3 a foamable material containing expandable microspheres 54 to the surface structuring 62,
forming S4 an elastomeric sealing element 52 on the metal layer 60 by expanding the microspheres 54, wherein a distribution of the expanded microspheres 54 in the sealing element 52, measured perpendicular to the surface 61 of the metal layer 60, is inhomogeneous.

In certain embodiments, the depressions 64 in step S2 are created by laser radiation. For example, a pulsed laser can be used for this.

In an optional method step P, a sealing bead 12a-d, 65 is integrally formed in the metal layer 60, for example by embossing, deep drawing and/or hydroforming. This may take place before, at the same time as or after the creation of the surface structuring 62 in the metal layer 60.

FIG. 20 shows a microscope image of a metal layer 60 which has been provided with a surface structuring 62 by means of a laser. The laser system used here has a power of 100 Watt of laser at a wavelength of 1064 nm, a focal length of 254 mm and an ablation rate of around 25 $cm^2/s$. Of course, other laser systems or lasers are also suitable for creating the surface structuring 62 or depressions 64.

With regard to the properties of the depressions 64 of the surface structuring 62, reference is made to what has been stated above. As can also be seen from FIG. 20, the depressions 64 may be arranged for example in rows or paths 69 extending parallel to one another; this may be the case when providing surface structuring on straight portions of a perimeter bead. The row arrangement 69 of the depressions 64 may be a consequence of producing the depressions 64 by means of the laser. It is also possible to arrange the depressions on concentric circles, as may be used for example in the case of port beads. In this case, the concentric circles form the paths 69. Many other forms are conceivable; for example, the depressions may be arranged next to one another on paths 69 such that the paths follow the course of the surface to be structured, that is to say at least in an approximately wave-like manner in the case of beads extending in a wave-like manner. The depressions 64 may each be at least partially surrounded by elevations 75, which are formed at the respective circumferential edge of the depressions. The respective elevation 75 may project above the untreated surface 63 of the metal layer 60. Said elevation 75 is typically formed when forming the depressions 64, for example by laser radiation, the elevation 75 being formed as a crater edge by solidification of molten material. The crater edge or the elevation 75 may thus be formed of the material that has migrated from the depressions 64.

It can also be seen in FIG. 20 that the circumferential edge of the depressions 64 is substantially round. The substantially round depressions 64 have a diameter of around 65 μm. The shape of the circumferential edge of the depressions may depend on the lateral extent of the laser beam used and the angle of incidence of the laser beam onto the metal layer 60. The shape of the circumferential edge may thus also depend on the respective position of the depressions 64 on the metal layer 60. By way of example, the circumferential edge of the depressions 64 arranged on the bead top 68 may be round, while the circumferential edge of the depressions 64 arranged on the bead flank 66, 66' may be elliptical or oval. The reason for this dependence may lie in the aforementioned dependence on the angle of incidence of the laser light, since the bead top 68 and the bead flank 66, 66' usually have different surface normals.

To achieve a sufficient effect of the surface structuring 62, a maximum spacing of adjacent depressions 64 may be at most five times the diameter of a depression 64. On the other hand, the depressions 64 are not arranged too close to one another since this could lead to destruction of the material. Adjacent depressions 64 may have a minimum spacing which corresponds to half the diameter of the depressions 64. The spacing between adjacent depressions 64 may be different in the longitudinal direction (that is to say in the longitudinal direction of the row or path 69) and in the transverse direction of the sealing element 52. In the transverse direction, the minimum spacing may correspond to at least half the diameter. Furthermore, in the transverse direction, the maximum spacing may correspond to at most three times the diameter. In the longitudinal direction, the minimum spacing may correspond to at least the diameter of a depression. In the longitudinal direction, the maximum spacing may be five times the diameter. In the example of FIG. 12, spacings are considered only within a contiguous surface-structured area, that is to say, on the one hand in the area of the bead flank 66 and the left-hand area of the bead top 68 and on the other hand in the area of the bead flank 66' and the right-hand area of the bead top 68.

In alternative variants of the method, the depressions 64 are created for example by engraving or scoring to produce a microstructure. In this case, the depressions 64 may be configured either as round or as elliptical or oval depressions; in some embodiments, these shapes can be combined with one another.

In step S3, the foamable material may be applied to the metal layer 60 or the surface structuring 62 thereof by spraying, brush electroplating, screen printing, roller printing, stencil printing or metering processes. Once the foamable material has been applied to the surface structuring 62, a solvent contained in the foamable material can evaporate. The evaporation of the solvent can be encouraged by applying a negative pressure or vacuum or by increasing to a first temperature. In a further step, the elastomeric material can be crosslinked or partially crosslinked. This (partial) crosslinking can be encouraged for example by a jump in temperature, for example by increasing to a second temperature which may be higher than the first temperature, or by UV radiation.

As a result of the increase in temperature, the microspheres 54 expand due to a phase change of the medium contained therein from the liquid phase to the gas phase. The expanded shape of the microspheres is maintained even on cooling due to the crosslinking of the polymer and the incorporation of the shell of the microspheres into the surrounding polymer.

In some embodiments of the method, the microspheres 54 in the non-expanded state have a mean diameter of at least 5 μm and/or at most 50 μm. In the expanded state, the microspheres 54 may have a mean diameter of at least 20 and/or at most 80 μm. By expanding the microspheres 54, the maximum thickness of the sealing element 52 applied as a layer typically expands to a multiple. By way of example, the finished sealing element 52 has a maximum layer thickness which is four times the layer thickness of the foamable material.

The method is suitable for producing the above-described sealing arrangement 50, the plate assembly 70 and/or the electrochemical system 1. Features which are described in connection with the sealing arrangement 50, the plate assembly 70 and/or the electrochemical system 1 can therefore be combined or claimed with the method, and vice versa.

FIGS. 1-18 and 20 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Further, elements shown intersecting one another may be referred to as intersecting elements or intersecting one another, in at least one example. Further still, an element shown within another element or shown outside of another element may be referred as such, in one example.

It will be appreciated that the configurations and routines disclosed herein are exemplary in nature, and that these specific embodiments are not to be considered in a limiting sense, because numerous variations are possible. Moreover, unless explicitly stated to the contrary, the terms "first," "second," "third," and the like are not intended to denote any order, position, quantity, or importance, but rather are used merely as labels to distinguish one element from another. The subject matter of the present disclosure includes all novel and non-obvious combinations and sub-combinations of the various systems and configurations, and other features, functions, and/or properties disclosed herein.

As used herein, the term "approximately" is construed to mean plus or minus five percent of the range unless otherwise specified.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

LIST OF REFERENCE SIGNS

1 electrochemical system
2 bipolar plate
2*a* separator plate (individual plate)
2*b* separator plate (individual plate)
3 end plate
4 end plate
5 media port
6 stack
7 z-direction
8 x-direction
9 y-direction
10 membrane electrode assembly
11*a-c* through-openings
12*a-d* sealing beads
13 passages
13*a-c* passages
14 membrane
15 sealing edge region
16 gas diffusion layer
17 flow field
18 electrochemically active region
19 cavity
20 distribution and collection region
22 outer edge region
24 contact region
29 channel
50 sealing arrangement 52 elastomeric sealing element
54 microspheres
56 elastomer
57 first interface (metal sheet 13 elastomer)
58 gas
59 second interface (elastomer—surrounding environment)
60 metal layer
61 surface of the metal layer
62 surface structuring
63 untreated area
64 depressions
65 bead
66, 66' bead flank
67, 67' bead foot
68 bead top
69 row of depressions
70 plate assembly
75 crater edge

The invention claimed is:

1. An electrochemical system, comprising a sealing arrangement, comprising: an elastomeric sealing element, which comprises a foamed material containing microspheres, a metal layer comprising a sealing bead, the sealing bead extending outward from the metal layer and comprising a bead top, a surface structuring applied to at least the bead top, the surface structuring comprising a plurality of depressions, the sealing element formed as a coating on the bead and the sealing element arranged on the surface structuring, at least in some areas, and a concentration of the microspheres in the sealing element, measured perpendicular to the surface of the metal layer, is inhomogeneous.

2. An electrochemical system, comprising the sealing arrangement according to claim 1, wherein the sealing element has a first interface adjoining the metal layer, the first interface having a first thickness and a first concentration of microspheres, and the concentration of the microspheres in the sealing element outside of the first thickness is higher than the first concentration.

3. An electrochemical system, comprising the sealing arrangement according to claim 2, wherein the sealing element has a second interface arranged on an opposite side of the sealing element from the first interface, and the concentration of the microspheres in the sealing element is lower within the second interface than outside of the first interface and the second interface.

4. An electrochemical system, comprising the sealing arrangement according to claim 3, wherein the first and second interfaces together have a thickness of no more than 35%, relative to a total maximum layer thickness of the sealing element measured perpendicular to the surface of the metal layer.

5. An electrochemical system, comprising the sealing arrangement according to claim 1, wherein a mean diameter of the microspheres is at least 20 pm and/or at most 80 pm.

6. An electrochemical system, comprising the sealing arrangement according to claim 1, wherein the depressions have a width and/or a diameter, measured at the mid-height of the depressions and/or parallel to the untreated metal surface, of at most 150 pm.

7. An electrochemical system, comprising the sealing arrangement according to claim 1, wherein the depressions have a depth, measured from the untreated surface to a lowest point of the depression, of at least 2 pm and/or at most 40 pm, and/or wherein the depressions have a depth of no more than 20% of a thickness of the metal layer.

8. An electrochemical system, comprising the sealing arrangement according to claim 1, further comprising at least one bead integrally formed in the metal layer, the surface structuring being formed on a surface of the bead at least in a direction of extension of the bead and the sealing element being arranged on the surface structuring at least in the direction of the extension of the bead.

9. An electrochemical system, comprising a sealing arrangement, comprising: an elastomeric sealing element, which comprises a foamed material containing microspheres, a metal layer having a surface structuring, the surface structuring comprising a plurality of depressions, the sealing element formed as a coating on the metal layer and arranged at least in some areas on the surface structuring, a concentration of the microspheres in the sealing element, measured perpendicular to the surface of the metal layer, is inhomogeneous, and at least one bead integrally formed in the metal layer, the surface structuring being formed on a surface of the bead and the sealing element being arranged on the bead, wherein the bead has a bead top and at least one bead flank adjoining the bead top, the surface structuring extending at least in some areas over the bead top and/or the at least one bead flank.

10. An electrochemical system, comprising the sealing arrangement according to claim 1, wherein the elastomeric sealing element contains FPM (fluoroelastomer), silicone rubber or NBR rubber (nitrile butadiene rubber), PUR (polyurethane), NR (natural rubber), FFKM (perfluoro rubber), SBR (styrene butadiene rubber), BR (butyl rubber), FVSQ (fluorosilicone), CSM (chloro-sulphonated polyethylene), silicone resin, epoxy resin, or mixtures of the aforementioned substances, or pressure sensitive adhesive and/or physically binding adhesive.

11. An electrochemical system, comprising the sealing arrangement according to claim 1, wherein the microspheres are filled with a gaseous medium of a gaseous hydrocarbon.

12. An electrochemical system, comprising the sealing arrangement according to claim 1, wherein the sealing element surrounds, in an intrinsically closed manner, at least one through-opening for gas or liquid the metal layer, and the metal layer is a separator plate or part of a bipolar plate for an electrochemical system comprising two or more separator plates, and wherein the sealing element of two separator plates contacts opposing sides of a membrane electrode assembly to form a sealing relationship.

13. A plate assembly for an electrochemical system, comprising: a sealing arrangement having an elastomeric sealing element, which comprises a foamed material containing microspheres, two separator plates configured as metal layers, having a surface structuring at least in some areas, the surface structuring comprising a plurality of depressions, a membrane electrode assembly arranged between the separator plates, the sealing element formed as a coating on at least one side of each of the separator plates and arranged at least in some areas on the surface structuring, and an inhomogeneous concentration of the microspheres in the sealing element, measured perpendicular to the surface of the metal layer.

14. An electrochemical system, comprising a plurality of plate assemblies according to claim 13.

15. The plate assembly of claim 13, wherein each separator plate comprises a sealing bead extending outward from the plate, at least part of a top of each sealing bead distal from the separator plate including the surface structuring, at least part of the sealing element positioned on the surface structuring on the bead top of each separator plate, and each sealing element on each bead top contacting opposing sides of the membrane electrode assembly to form a seal.

16. The plate assembly of claim 15, wherein the sealing bead surrounds and forms a perimeter seal around a flow field of the plate assembly.

* * * * *